(No Model.)  2 Sheets—Sheet 1.
L. W. LEEDS.
APPARATUS FOR HEATING BY GAS OR LIQUID FUEL.
No. 426,596.  Patented Apr. 29, 1890.

Witnesses.  Inventor.

(No Model.) 2 Sheets—Sheet 2.

L. W. LEEDS.
APPARATUS FOR HEATING BY GAS OR LIQUID FUEL.

No. 426,596. Patented Apr. 29, 1890.

Witnesses. Inventor:

UNITED STATES PATENT OFFICE.

LEWIS W. LEEDS, OF LONDON, ENGLAND.

APPARATUS FOR HEATING BY GAS OR LIQUID FUEL.

SPECIFICATION forming part of Letters Patent No. 426,596, dated April 29, 1890.

Application filed November 30, 1887. Serial No. 256,553. (No model.) Patented in England April 29, 1886, No. 5,841, September 20, 1886, No. 11,930, and January 15, 1887, No. 668; in France May 6, 1886, No. 175,951, and in Belgium May 8, 1886, No. 73,038, and September 29, 1886, No. 74,668.

*To all whom it may concern:*

Be it known that I, LEWIS WALKER LEEDS, a citizen of the United States, residing at 38 Old Jewry, in the city of London, England, have invented a certain new and useful Improvement in Apparatus for Heating by Gas or Liquid Fuel, (for which I have obtained Letters Patent in Great Britain, No. 5,841, dated April 29, 1886, No. 11,930, dated September 20, 1886, and No. 668, dated January 15, 1887; in France, No. 175,951, dated May 6, 1886, and an addition thereto dated September 28, 1886; in Belgium, No. 73,038, dated May 8, 1886, and No. 74,668, dated September 29, 1886,) of which the following is a specification.

This invention relates to an improved construction and arrangement of apparatus for heating by gas or by liquid fuel.

The invention may be briefly described as consisting of an arrangement of one or more jets of flame burning in the open air or with a full supply of air beneath an arch or layer of asbestus, slag wool, or other refractory material with a backing of glass, and placed at or near the base of a surrounding receptacle closed at its sides and top, all as hereinafter more fully set forth and claimed.

In order that others skilled in the art may clearly understand my invention, reference is made to the accompanying drawings, which form part of this specification, and in which—

Figure 1:
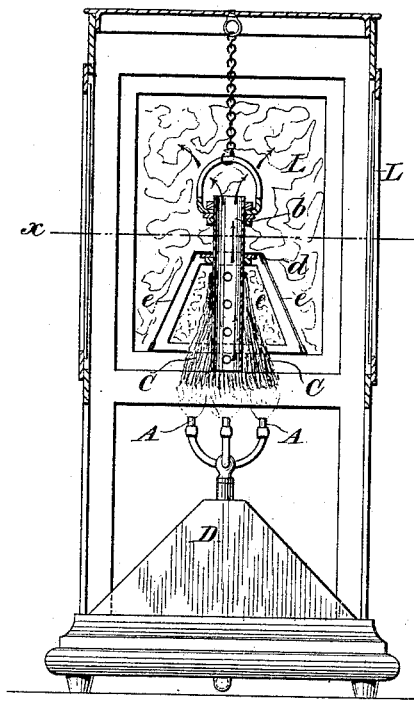
Figure 3:
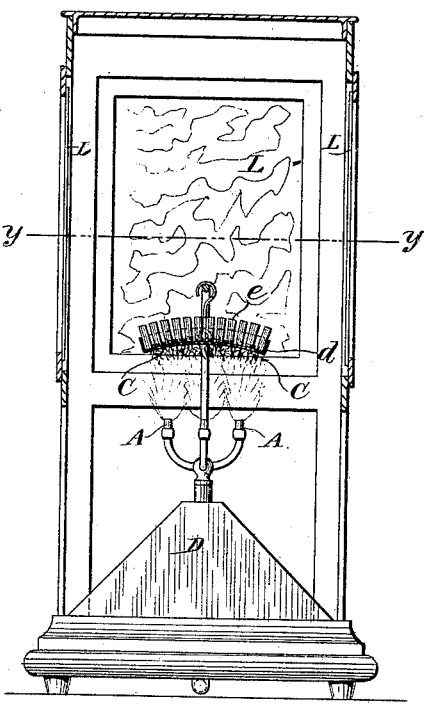
Figure 2:
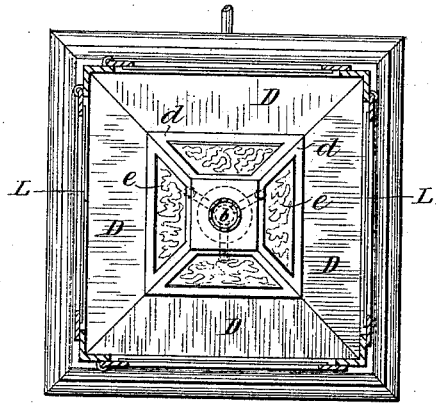
Figure 4:
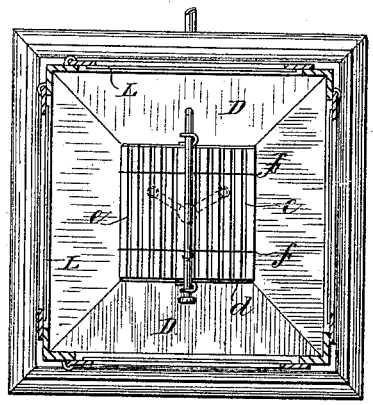
Figure 5:
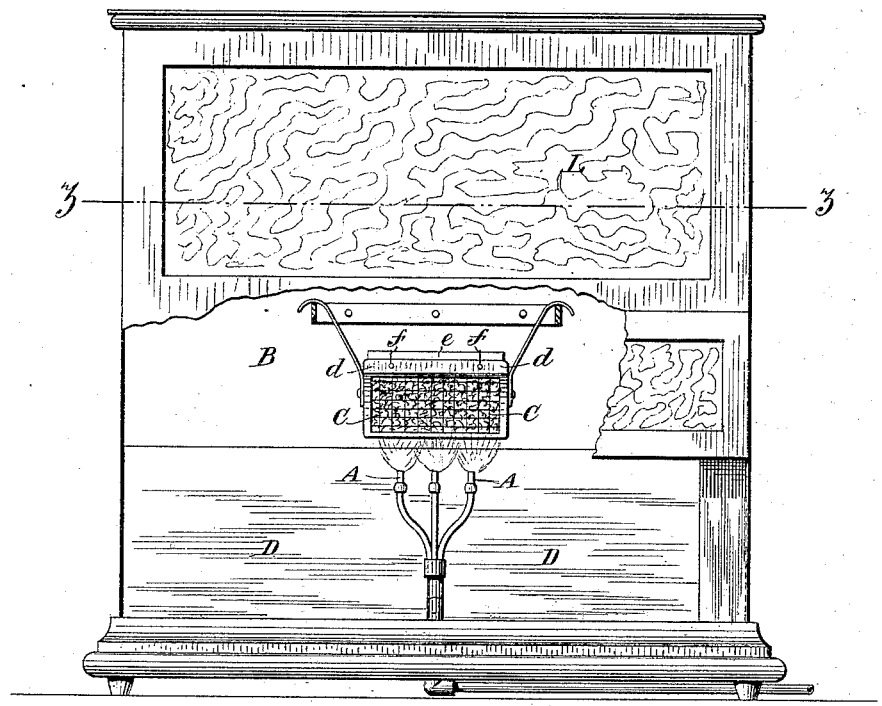
Figure 6:
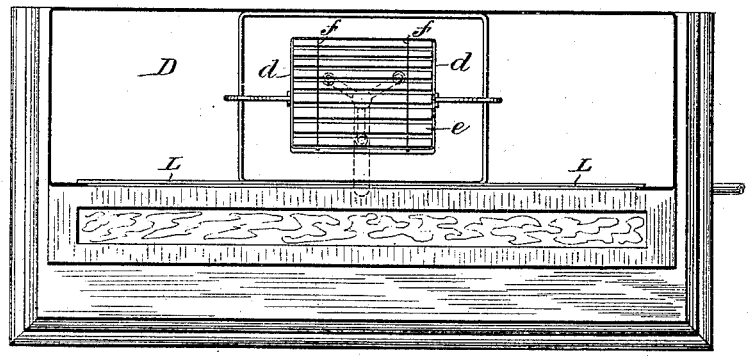

Figure 1 is a side elevation, partly in section, of a square stove with glass sides and a layer of asbestus carried by a pipe within a glass reflector and deflector. Fig. 2 is a plan view on the line $x\,x$. Fig. 3 is a side elevation, partly in section, of a like stove with a modified form of reflector and deflector. Fig. 4 is a plan view on line $y\,y$. Fig. 5 is an elevation, partly in section, of a rectangular stove; and Fig. 6 is a plan view on the line $z\,z$.

Whatever the arrangement employed it is desirable that the gas-jets A should burn in the open air with a full supply of air, and that the gases or impure products of combustion may be subjected to the heat of the asbestus or other arch or layer C, as by this means all unpleasant fumes will be destroyed, further advantages being that the arch C, being composed of a comparatively thin layer of irregularly-shaped pieces of refractory material, readily becomes thoroughly heated to incandescence and radiates the heat downward in all directions, such portions thereof as would be ineffectual for heating the apartment being received upon an inclined reflector D, of polished metal or glass, and thereby diffused into all parts of the room in a much more satisfactory and pleasing manner than when the arch or layer C is composed of a thick mass of material or when its under surface is of regular shape.

When the stoves are to be used in drawing-rooms, offices, and like places, I preferably make the front or exposed side of said receptacle of glass, in order that the gas or jets of flame and asbestus or refractory arch may be clearly visible, and thus not only will the desired heat be secured, but a clear and pleasant light will be thrown into the room or apartment in which the stove is used, or when colored glass is used a colored glow or effect will be obtained.

In the drawings I have shown a refractory arch or layer which will deflect the heat in the desired direction without seriously impairing the reflection or transmission of light through the same. Such arch may consist of asbestus, slag wool, or other refractory material, in combination with an intermixture or a backing of glass formed in bell-arch or other suitable shape, depending upon the purpose to which it is to be applied.

In Figs. 1 and 2 the deflector and reflector are represented as consisting of asbestus, slag wool, or other fibrous refractory material C, which is secured to perforated pipe $b$, through which part of the products of combustion pass into the upper part of the stove.

Secured to pipe $b$ is the frame $d$, which carries colored or other glass $e$, which also serves to deflect the heat and yet permits the light from the burners A to pass through, as well as through the glass sides L of the stove. Frame $d$ may be of the form shown or of other suitable shape, or a bell-glass may be used. The light and heat deflected will be further radiated and reflected if the inclined faces D are composed of mirrors or bright metal.

In Figs. 3 and 4 the deflector and reflector are represented in an arch form, the frame $d$ having a bottom of wire-gauze through the interstices of which the asbestus or refractory material C projects, while the glass backing e is formed of strips of glass which may be held in place by frame d or by wires f, as shown, and may be held slightly apart by means of the asbestus passing between them. In Figs. 5 and 6 a similar arch is shown applied to a rectangular stove, and further description thereof is unnecessary, as is also any description of the means of supporting the various parts, as these may be varied as circumstances render advisable. It will be observed that in each construction is found a burner or series of burners arranged in the open air, and beneath an arch or layer of asbestus or kindred material arranged above the floor of the apartment, and which is heated by the flame from the burners to so high a degree that it becomes a radiator and deflector of heat, which is thereby thrown or deflected toward the floor or lower part of the apartment; and it will be further observed that in combination with the last-referred-to arrangement in each construction is one or more reflectors D, which, besides reflecting the direct heat from the flame, also reflect and deflect such heat thrown off from the refractory arch as is intercepted thereby, and which would otherwise be practically valueless for heating the apartment.

What I claim, and desire to secure by Letters Patent, is—

1. In a gas or liquid fuel stove, the combination of the burners, a mass of refractory material arranged above the burners in the path of the products of combustion to absorb and radiate the heat, and a transparent heat-deflector arranged adjacent to the refractory mass to permit the light rays therefrom to pass upward, but to deflect downward the heat-rays, substantially as described.

2. In a gas and liquid fuel stove, the combination of the burners, a mass of refractory material arranged above the burners in the path of the products of combustion to deflect downward the heat from the burning fuel, a transparent heat-deflector arranged adjacent to and above the refractory mass to permit the light therefrom to pass upward, but to absorb and radiate the heat, an inclined reflecting and deflecting surface below the burners to throw outward into the apartment the heat received thereon, and the inclosing-casing having transparent portions both above and below the mass of refractory material, substantially as described.

3. In a gas or liquid fuel stove, the combination, with the burners, of a deflecting-arch C, composed of asbestus or kindred material, and strips e of glass, arranged over the burners, substantially as described.

In testimony whereof I have hereunto set my hand in the presence of two subscribing witnesses.

LEWIS W. LEEDS.

Witnesses:
PHILIP M. JUSTICE,
JAMES BOLES.